(12) United States Patent
Owens et al.

(10) Patent No.: US 8,145,553 B2
(45) Date of Patent: *Mar. 27, 2012

(54) FLEXIBLE SYSTEM AND METHOD FOR ELECTRONIC TRADING

(75) Inventors: Farley Owens, Chicago, IL (US); Robert J. Kline, Chicago, IL (US); Diane Saucier, Evanston, IL (US); Nidhi Singh, Chicago, IL (US); Bharat Mittal, Schaumburg, IL (US)

(73) Assignee: Trading Technologies International Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/046,545

(22) Filed: Mar. 11, 2011

(65) Prior Publication Data

US 2011/0166984 A1 Jul. 7, 2011

Related U.S. Application Data

(63) Continuation of application No. 12/779,181, filed on May 13, 2010, now Pat. No. 7,930,233, which is a continuation of application No. 11/178,523, filed on Jul. 11, 2005, now Pat. No. 7,742,974.

(60) Provisional application No. 60/619,620, filed on Oct. 18, 2004.

(51) Int. Cl.
   *G06Q 40/00* (2006.01)
(52) U.S. Cl. .................... 705/36 R; 705/35; 705/37
(58) Field of Classification Search .............. 705/35, 705/36, 37

See application file for complete search history.

(56) References Cited

U.S. PATENT DOCUMENTS

| | | |
|---|---|---|
| 6,772,132 B1 | 8/2004 | Kemp, II et al. |
| 7,003,486 B1 | 2/2006 | Condamoor et al. |
| 7,127,424 B2 | 10/2006 | Kemp, II et al. |
| 7,389,268 B1 | 6/2008 | Kemp, II et al. |
| 2002/0082881 A1 | 6/2002 | Price et al. |
| 2002/0091617 A1 | 7/2002 | Keith |
| 2002/0099562 A1 | 7/2002 | Bruce, Sr. et al. |

(Continued)

FOREIGN PATENT DOCUMENTS

WO    WO 0122339 A2    3/2001

(Continued)

OTHER PUBLICATIONS

Flow-Based Transmission Rights and Congestion Management; Hung-po Chao, Stephen Peck, Shmuel Oren and Robert Wilson; The Electricity Journal; vol. 13, Issue 8, Oct. 2000, pp. 38-58.*

(Continued)

*Primary Examiner* — Alexander Kalinowski
*Assistant Examiner* — Abhishek Vyas
(74) *Attorney, Agent, or Firm* — McDonnell Boehnen Hulbert & Berghoff LLP

(57) ABSTRACT

System, method, and program products offer flexibility to the rather rigid way of trading in an electronic trading system. Orders for a tradeable object may typically get matched according to set terms and/or conditions at an electronic exchange. A trader may log onto the electronic exchange to trade the tradeable object, and may choose to display and trade the tradeable object according to a different set of terms and/or conditions. As such, the market data sent to the trader from the exchange is converted to a format according to the trader's selection, so that it may be presented to the trader in this format. Transaction messages sent to the exchange from the trader are converted to the format readable by the matching process, so that it can process the messages. Other features and advantages are described herein.

24 Claims, 5 Drawing Sheets

U.S. PATENT DOCUMENTS

| | | |
|---|---|---|
| 2002/0099640 A1 | 7/2002 | Lange |
| 2002/0099644 A1 | 7/2002 | Kemp, II et al. |
| 2002/0107746 A1 | 8/2002 | Jacoby, Jr. |
| 2002/0120555 A1* | 8/2002 | Lerner .................. 705/37 |
| 2003/0018558 A1 | 1/2003 | Heffner et al. |
| 2003/0055776 A1 | 3/2003 | Samuelson |
| 2003/0204467 A1 | 10/2003 | Kartha et al. |
| 2004/0019553 A1 | 1/2004 | Setz et al. |
| 2004/0093300 A1 | 5/2004 | Burns |
| 2005/0096931 A1 | 5/2005 | Baker et al. |
| 2006/0015436 A1 | 1/2006 | Burns et al. |
| 2006/0036448 A1* | 2/2006 | Haynie et al. .............. 705/1 |
| 2006/0259411 A1 | 11/2006 | Burns |
| 2006/0265316 A1 | 11/2006 | Brumfield et al. |
| 2006/0265322 A1 | 11/2006 | Burns |
| 2007/0100735 A1 | 5/2007 | Kemp et al. |
| 2007/0106590 A1 | 5/2007 | Triplett |

FOREIGN PATENT DOCUMENTS

| | | |
|---|---|---|
| WO | WO 0150378 A2 | 7/2001 |
| WO | WO 0165403 A2 | 9/2001 |
| WO | WO 0198963 A2 | 12/2001 |

OTHER PUBLICATIONS

Genetic algorithm based unit commitment with energy contracts; Weiguo Xing, and Felix E. Wu; Center for Electrical Energy Systems, Department of Electrical and Electronic Engineering, The University of Hong Kong, International Journal of Electrical Power & Energy Systems vol. 24, Issue 5, Jun. 2002, pp. 329-336.*

International Search Report for PCT/US05/37032.

European Search Report dated Jul. 27, 2009.

Flow-Based Transmission Rights and Congestion Management; Hung-Po Chao, Stephen Peck, Shmuel Oren and Robert Wilson, The Electricity Journal; vol. 13, Issue 8, Oct. 2000, pp. 38-58.

Genetic Algorithm Based Unit Commitment with Energy Contracts; Weiguo Xing, and Felix F. Wu; Center for Electrical Energy Systems, Department of Electrical and Electronic Engineering, The University of Hong Kong, International Journal of Electrical Power & Energy Systems, vol. 24, Issue 5, Jun. 2002, pp. 329-336.

* cited by examiner

| | | | | | |
|---|---|---|---|---|---|
| | Flow | Contract | | ▲ | |
| | | | | 5.027 | |
| | | | | 5.026 | |
| | +2 | | | 5.025 | |
| | | | | 5.024 | |
| | 0 | | | 5.023 | |
| | 1 | 5 | | 5.022 | |
| | 10 | 20 | | 5.021 | |
| | 50 | 100 | 3 | 5.020 | |
| | CLR | | | 5.019 | |
| | 0 | | 6 | 5.018 | |
| | | | 5 | 5.017 | |
| | | | 13 | 5.016 | |
| | Del All | | | 5.015 | |
| | Del 0 | | 3 | 5.014 | 1▶ |
| | Del 0 | | 20 | 5.013 | |
| B | 1 | | 15 | 5.012 | |
| | | | 10 | 5.011 | |
| | | | | 5.010 | |

FIG. 5

FLEXIBLE SYSTEM AND METHOD FOR ELECTRONIC TRADING

CROSS REFERENCE TO RELATED APPLICATIONS

The present application is a continuation of U.S. patent application Ser. No. 12/779,181, now U.S. Pat. No. 7,930,233, filed on May 13, 2010, which claims priority to U.S. patent application Ser. No. 11/178,523, now U.S. Pat. No. 7,742,974, filed on Jul. 11, 2005. The Ser. No. 11/178,523 application claims priority to U.S. Provisional Patent Application No. 60/619,620, filed on Oct. 18, 2004. The contents of each of the above-disclosed applications are incorporated herein by reference in their entirety.

TECHNICAL FIELD

The present invention relates generally to data processing systems for use in electronic trading and, more particularly, the present invention is directed to a flexible system and method for electronic trading.

BACKGROUND

An electronic trading system includes a host exchange that has a central computer in which bids and offers are received and executed, if a match exists between them. The host exchange provides a summary of the bids and offers for viewing by those traders that have access to the trading system. At their trading stations, the traders can monitor their screens and freely enter bids or offers, which are communicated to the host exchange.

To communicate with the central computer at the host exchange, certain message protocols are defined and employed. For instance, at a low level, the message protocol includes definitions for the message header, payload, and trailer. Beyond that, there are certain defined processes utilized to open a connection with the host exchange, retrieve market data, add an order, change an order, delete an order, close the connection, and so on. The message protocols can be as simple or complex as the electronic exchange deems necessary to offer its tradeable objects for trade. Whatever the defined message protocol, the messaging between the central computer and the trading terminal must follow the protocol, or else, the communication will likely fail.

Once logged onto the host exchange, the trader can choose from a variety of tradeable objects to trade. As used herein, the term "tradeable object," refers simply to anything that can be traded with a quantity and/or price. It includes, but is not limited to, all types of tradeable events, goods, and financial products. For instance, stocks, options, bonds, futures, currency, and warrants, as well as funds, derivatives and collections of the foregoing, and all types of commodities, such as grains, energy, and metals may be considered tradeable objects. A tradeable object may be "real," such as products that are listed by an exchange for trading, or "synthetic," such as a combination of real products that is created by the user. A tradeable object could actually be a combination of other tradeable object, such as a class of tradeable objects.

When a trading session begins, the trading station receives the market information in a data feed being distributed from the central computer at the electronic exchange. The trading station has software that collects information from this data feed and displays it to the trader. For instance, the data feed may include a message that contains price and quantity information, which represents orders in the market. The software can strip the price and quantity information from the message and display it to the trader. From this display, a trader may view the information and make decisions on whether to enter an order, modify an order, or perform some other trading related operation. Sometimes the decisions regarding a trader's particular trading strategy are performed by a computer itself given initial instruction by the trader. When an action is taken, the trading station generates a message according to the defined message protocol, populates the various fields in the message, and sends it to the central computer at the electronic exchange. Then, the central computer will receive the message and take the appropriate action.

Each tradeable object is traded according to a particular set of terms or conditions, which are often set forth by the electronic exchange. For instance, a tradeable object might have a certain contract size and/or trading unit. The central computer is programmed to match orders based on those predefined terms and conditions. Additionally, the information content in the data feed provided by the central computer also conforms to the predefined terms and conditions. Traders receive this information (in the format set by the exchange) and take action, whether it is watching the market, entering orders, managing orders, and so on. While this generally rigid way of trading may work for some types of trading, it is desirable to offer a system and method that adds flexibility to the rather rigid way of trading in an electronic trading system.

BRIEF DESCRIPTION OF THE DRAWINGS

Many aspects of the present embodiments may be better understood with reference to the following drawings. The components in the drawings are not necessarily to scale, emphasis instead being placed upon illustrating example embodiments:

FIG. 5 illustrates a screen shot for showing an example display of the same market information presented in FIG. 4 at the trading station, except the presentation of the market information is based on a format chosen by the trader, such that the market information has units of a type different than what the electronic exchange provided in FIG. 4.

DETAILED DESCRIPTION

I. Overview

Figure 1:
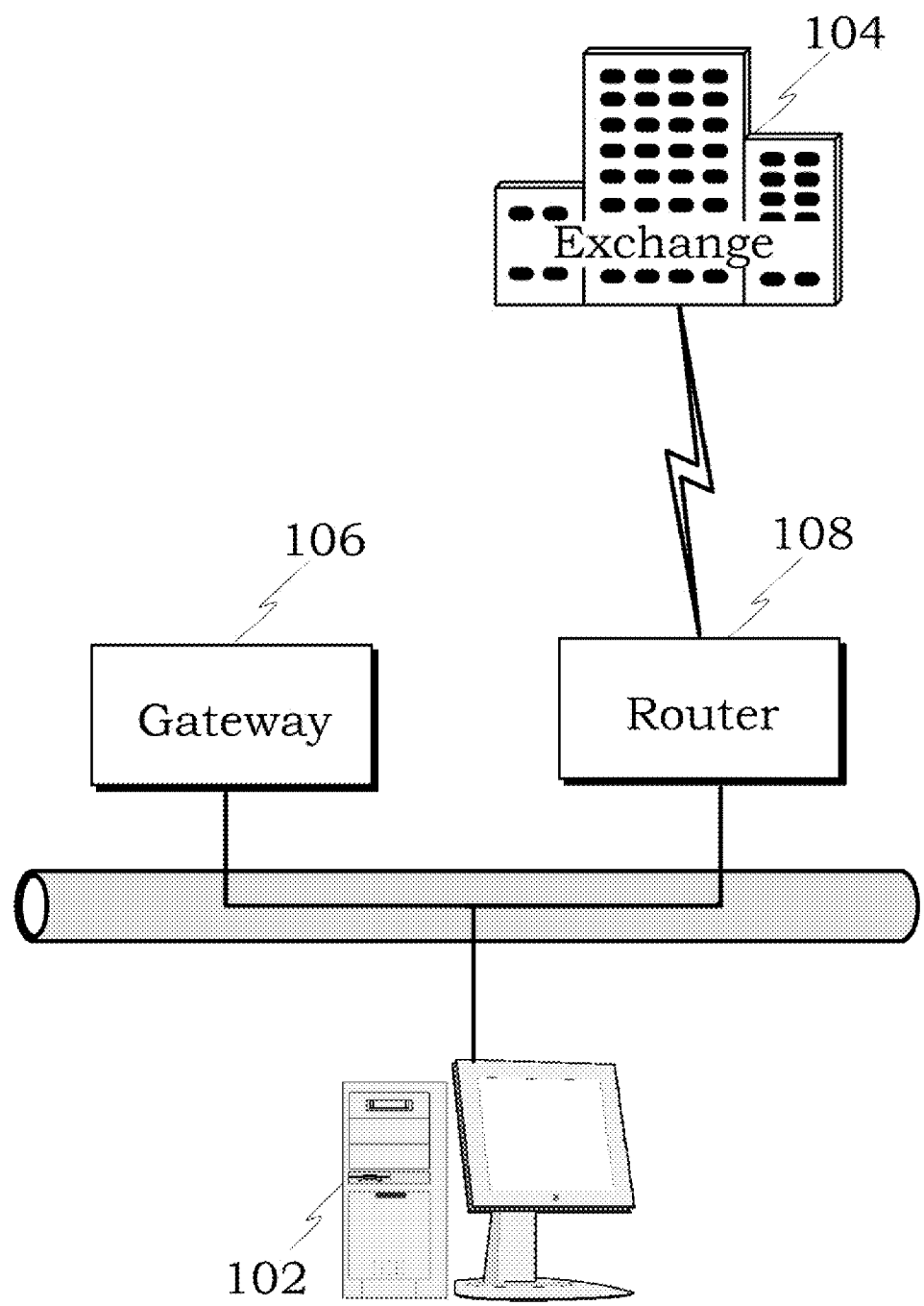
FIG. 1 illustrates an example trading system for electronic trading according to an example embodiment, wherein the trading system includes a trading station where a trader can submit bids and offers for a tradeable object being traded at an electronic exchange.

At the heart of an electronic trading system lays an automated matching process. Bids and offers are received, validated, and queued in price sequence and within price by time of entry, although other matching variations exist. There are many benefits of having an automated matching process, such that it allows for a more efficient marketplace than traditional ways of trading. To take advantage of the benefits of electronic trading, some markets, like the energy market, have opened up trading to all sorts of market participants. For some tradeable objects within the energy market, like power, deregulation has also played a part in giving access to those beyond the actual producer and distributor of power to speculators and other types of professional traders.

In trading generally, the price changes of a tradeable object are reactions to news or some other source. Thus, it becomes important that the speed of the price changes be made available to everyone participating. The rapid spread of new price information is performed by the electronic trading system in which all bids and offers are made available to the participants. Upon viewing the price information, the market participants may react by entering bids, offers, or other kinds of transaction messages. Regardless of whether the trader must react instantly to the new price information or there is a lot of information to review before an action is taken, it is generally desirable to have the tools in place to assist the trader in assimilating the information that is presented.

As indicated earlier, a tradeable object is traded according to a particular set of terms or conditions. Given the nature of a particular tradeable object or how it has been traded in the past, the given terms or conditions may be more relevant to one group of market participants rather than another group of market participants. While this may be true for many different classes of tradeable objects, it may be particularly seen in the energy markets. For instance, a producer of power (for example, a power plant) and a distributor of power (for example, a power company) may talk about the buying and selling of power in mega-watt hours (MWhrs) for particular time periods, whereas, a professional trader may be used to buying and selling tradeable objects in a standardized unit, such as contracts. Yet, electronic exchanges that now offer these tradeable objects to a broad spectrum of market participants (for example, not just the producer or distributor) offer them in their standard adopted units (for example, MWhrs/day in the example of power). For these types of tradeable objects, the standard adopted units are not always the easiest to view and/or use by some traders. Despite traders having computer systems that can analyze the information according to its standard adopted units, it may be more desirable to present the information in a different way.

The embodiments, such as described herein, provide increased flexibility to the trader by offering the trader the ability to trade a tradeable object in a format that is preferred by the trader, rather than in a format that is based on the rigid set of terms and/or conditions provided by an exchange. As such, it allows the trader, among other things, to view the market information, make trades, and analyze market data according to the trader's preferred format.

In particular, the embodiments operate with an electronic exchange that processes price information and/or order information according to units of a first type, and the embodiments operate to convert that information into more preferred units of a second type. Preferably, the tradeable object that has units of a second type is chosen such that the information is more easily viewable and/or useable by the trader. Further, the embodiments allow the trader to seamlessly trade according to the preferred units of the second type even though it is not supported by the central computer at the electronic exchange. Using the power example above, if an electronic exchange offers power for trade in units of MWhrs/day, a trader, at the trading station, may buy or sell the tradeable object in units of contracts rather than in MWhrs/day; the system will then convert the transaction messages from contracts into MWhrs/day so that the central computer can process the messages.

Additionally, the conversion into preferred units now enables the information to be presented in a way that is easily understood by traders who are used to trading according to a particular unit (for example, traders may be used to trading in units widely adopted by other exchanges, rather than in some other unit provided by a specific central computer.) Furthermore, the trader can trade all of his or her tradeable objects, whether some tradeable objects necessitate conversion or not, in the same consistent units, thereby making certain types of strategies easier to perform and/or monitor. For instance, if a trader wants to spread trade power, which is given in MWhrs/day, and another tradeable object, which is given in another unit, with the use of the example embodiments, the trader can view and effectively trade both power and the other tradeable object in the same units (for example, in contracts). The trader may also compute other items of interest, such as profit and loss or position, based upon a conversion.

The example embodiments are particularly useful at the client side (for example, the trader's network side). At the client side, the embodiments can add flexibility to central computers that abide by a particular set of terms and conditions. Then, if a trader wants to trade the tradeable object according to a different way than what is allowed by the central computer, he or she can do so using the embodiments described herein. The example embodiments may also be useful at the exchange side. At the exchange side, the embodiments can add flexibility in the way central computers process messages, so as not to be limited by one set of terms and conditions.

Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. A First Example Trading System

FIG. 1 illustrates an example electronic trading system in which the example embodiments may be employed. In this example, the system comprises a trading station 102 that accesses an electronic exchange 104 through a gateway 106. Router 108 is used to route messages between the gateway 106 and the electronic exchange 104. The electronic exchange 104 is where buy and sell orders sent from the trading station 102 are matched by a computer process (e.g., the central computer) with orders from other trading stations (not shown). The electronic exchange 104 may list one or more tradeable objects for trade. While not shown in the figure for the sake of clarity, the trading system may include other devices that are specific to the client site like middleware and security measures like firewalls, hubs, security managers, and so on, as understood by a person skilled in the art.

The computer employed as the trading station 102 generally can range from a hand-held device, laptop, or personal computer to a larger computer such as a workstation and multiprocessor. An illustrative personal computer uses Pentium™ microprocessors and operates under a Windows 2000™, Windows NT™, or Windows XP™ operating system with 3Com's 3CR990-TX-97 network card. Generally, the trading station 102 includes a monitor (or any other output device) and an input device, such as a keyboard and/or a two or three-button mouse to support click based trading, if so desired. One skilled in the art of computer systems will understand that the present embodiment is not limited to a particular class or model of computer employed for the trading station 102 and will be able to select an appropriate system.

The computer employed as the gateway 106 generally can range from a personal computer to a larger computer. An illustrative gateway 106 computer uses Pentium™ microprocessors and operates under a Windows 2000™ or Windows NT™ (server or workstation) operating system with 3Com's 3CR990SRV97 network card. Generally, the gateway 106 may additionally include a monitor (or any other output device), input device, and access to a database, if so desired. One skilled in the art of computer systems will also understand that the present embodiment is not limited to particular class or model of computer(s) employed for the gateway 106 and will be able to select an appropriate system.

It should be noted that a computer system that may be employed here as a trading station or a gateway generally includes a central processing unit, a memory (a primary and/or secondary memory unit), an input interface for receiving data from a communications network, an input interface for receiving input signals from one or more input devices (for example, a keyboard, mouse, etc.), and an output interface for communications with an output device (for example, a monitor). A system bus or an equivalent system may provide communications between these various elements.

It should also be noted that the trading station 102 generally executes application programs resident at the trading station 102 under the control of the operating system of the trading station 102. Also, the gateway 106 executes application programs resident at the gateway 106 under the control of the operating system of the gateway 106. In other embodiments and as understood by a person skilled in the art, the function of the application programs at the trading station 102 may be performed by the gateway 106, and likewise, the function of the application programs at the gateway 106 may be performed by the trading station 102.

The actual electronic trading system configurations are numerous, and a person skilled in the art of electronic trading systems would be able to construct a suitable network configuration. For the purposes of illustration, some example configurations are provided to illustrate where the elements may be physically located and how they might be connected to form an electronic trading system; these illustrations are meant to be helpful to the reader and they are not meant to be limiting. According to one example illustration, the gateway device may be located at the client site along with the trading station, which is usually remote from the matching process at the electronic exchange. According to this instance, the trading station, the gateway, and the router may communicate over a local area network, and the router may communicate with the matching process at the electronic exchange over a T1, T3, ISDN, or some other high speed connection.

In another example illustration, the client site may be located on the actual grounds of the electronic exchange (for example, in the building of the exchange). According to this instance, the trading station, the gateway, and the router may still communicate over a local area network, but the router may communicate with the matching process at the electronic exchange through another connection means besides a T1, T3, or ISDN.

In yet another example illustration, the gateway may be housed at, or near, its corresponding electronic exchange. According to this instance, the trading station may communicate with the gateway over a wide area network or through the use of a T1, T3, ISDN, or some other high speed connection.

In another example illustration, the gateway may be located remote from the trading station and remote from the electronic exchange, which might be particularly useful in systems that include interconnection of multiple trading networks. Thus, one trading network might have gateway access to an electronic exchange. Then, other trading networks may communicate with the trading network that has gateway access through a T1, T3, ISDN, or some other high speed connection.

III. A Second Example Trading System

Figure 2:
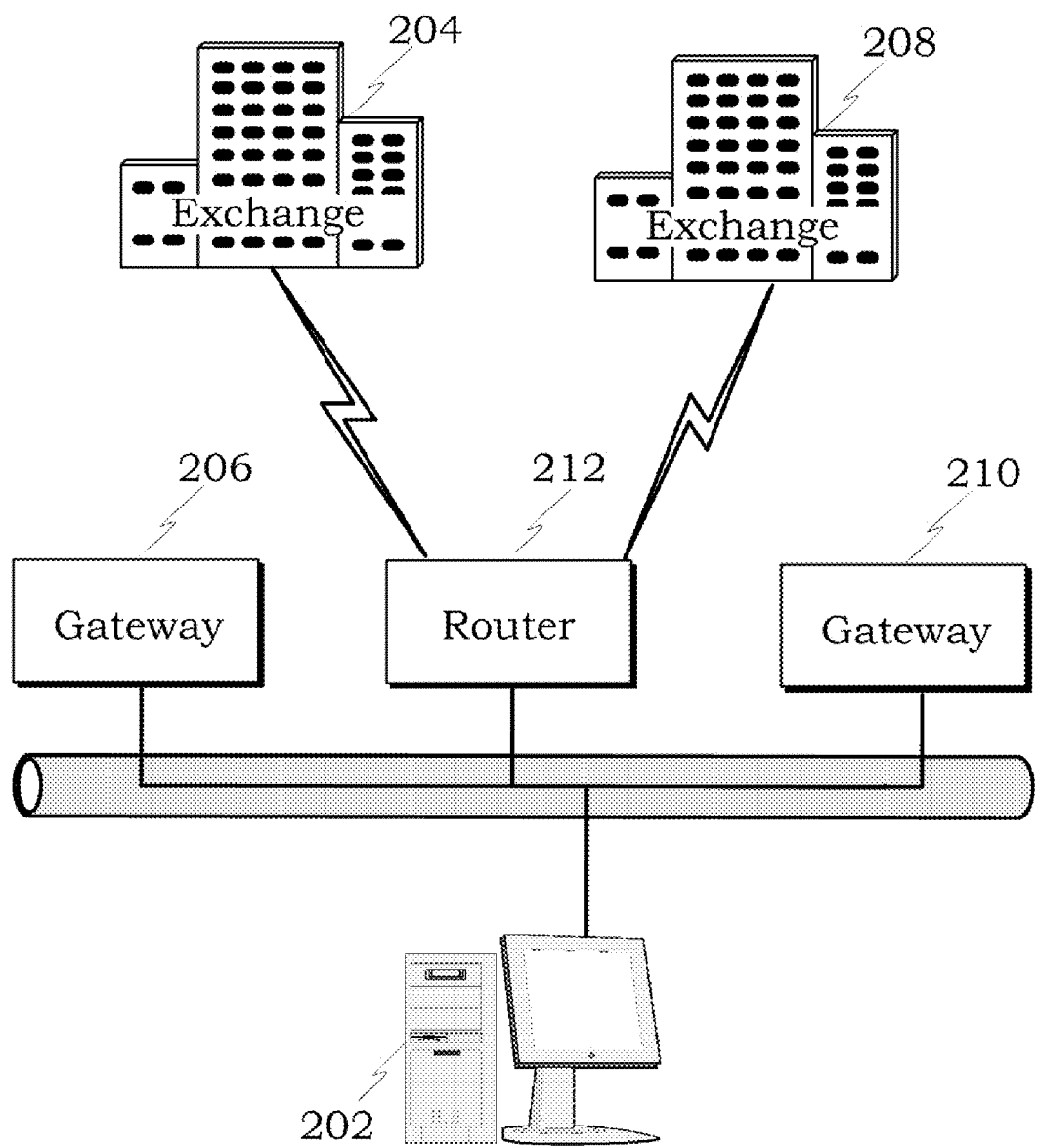
FIG. 2 illustrates another example trading system for electronic trading according to another example embodiment, wherein the trading system includes a trading station where a trader can submit bids and offers for a tradeable object being traded at more than one electronic exchange.

FIG. 2 illustrates another example trading system that uses similar computer elements as shown in FIG. 1, in which, the example embodiments may be employed to trade at multiple electronic exchanges. The system comprises a trading station 202 that can access multiple electronic exchanges 204 and 208. In this particular embodiment, electronic exchange 204 is accessed through gateway 206 and electronic exchange 208 is accessed through another gateway 210. Alternatively, a single gateway may be programmed to handle more than one electronic exchange. Router 212 is used to route messages between the gateways 206 and 210 and the electronic exchanges 204 and 208. While not shown in the figure, the system may include other devices that are specific to the client site like middleware and security measures like firewalls, hubs, security managers, and so on, as understood by a person skilled in the art. Additional electronic exchanges may be added to the system so that the trader can trade at any number of exchanges, if so desired.

The trading system presented in FIG. 2 provides the trader with the opportunity to trade tradeable objects listed at different electronic exchanges. To some traders, there can be many advantages with a multi-exchange environment. For example, a trader could view market information from each tradeable object through one common visual display. As such, price and quantity information from the two separate exchanges may be presented together so that the trader can view both markets simultaneously in the same window. In another example, a trader can spread trade different tradeable objects listed at the different electronic exchanges.

As indicated earlier, one skilled in the art of electronic trading systems will understand that the present embodiments are not limited to the particular configurations illustrated and described with respect to FIG. 1 and FIG. 2, and will be able to design a particular system based on the specific requirements (for example, by adding additional exchanges, gateways, trading stations, routers, or other computers serving various functions like message handling and security). Additionally, several networks, like either of the networks shown in FIG. 1 or FIG. 2, may be linked together to communicatively access one or more electronic exchanges.

IV. Flow Diagram

Figure 3:
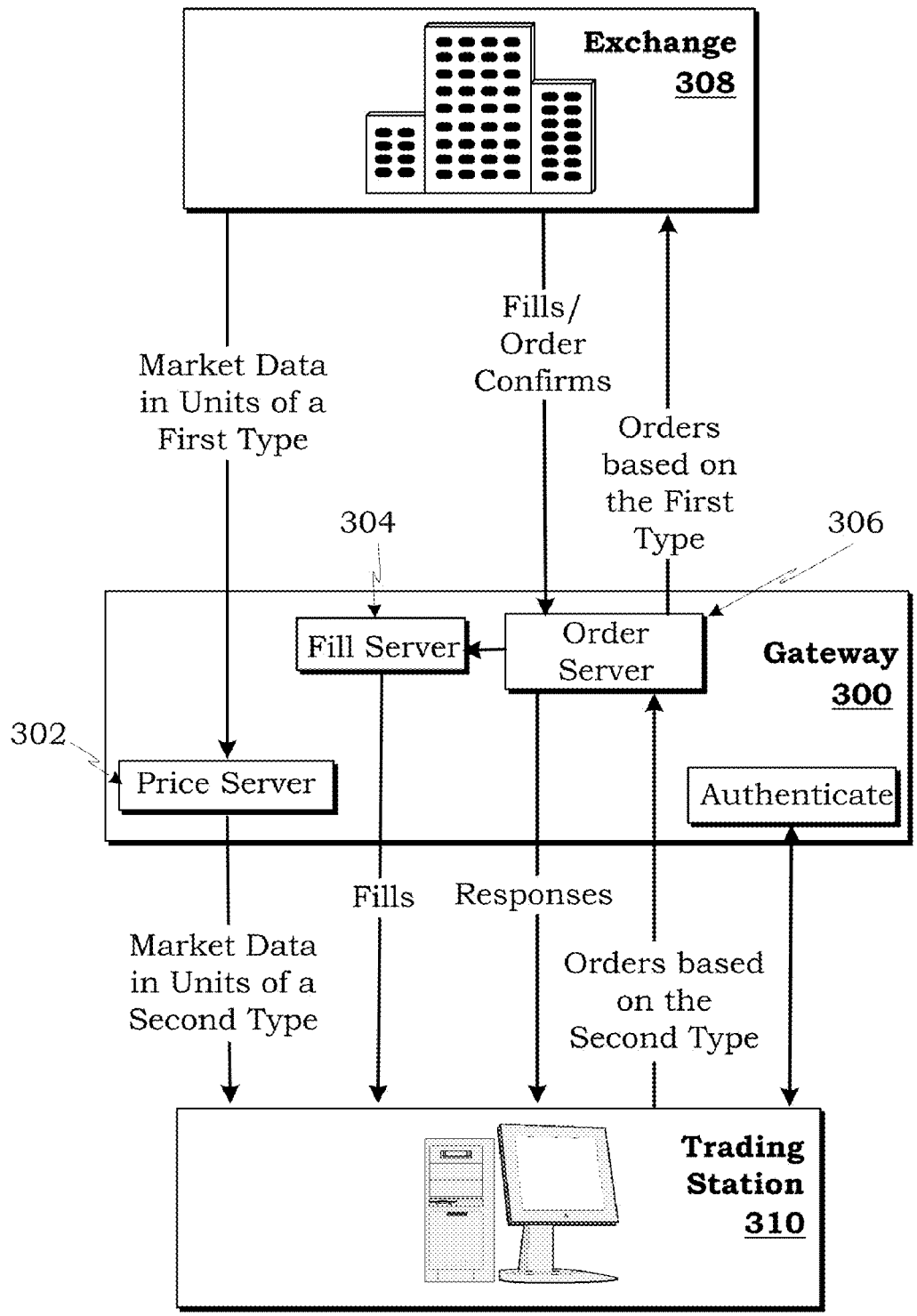
FIG. 3 illustrates a data flow diagram that demonstrates an example flow of information between the elements shown in FIGS. 1 and 2 for enabling simplified trading.

FIG. 3 is a flow diagram illustrating an example operation of either system of FIG. 1 or FIG. 2. This flow diagram provides an example of the flow of data by which a user communicates with the electronic exchange, receives market information for a selected tradeable object, and trades the tradeable object. Based on these examples, a person skilled in the art will understand how other sequences of operations can be performed.

As indicated by FIG. 3, the gateway 300 includes various components: price server 302, fill server 304, order server 306, and an authentication system that is used to authenticate the user and/or trading station 310. While the functionality of each of these gateway components may be distributed elsewhere in the trading system, a single computer, such as shown at the gateway 300 in the figure, may execute several programs at once (for example, a computer that employs a multiprocessing operating system).

According to an example embodiment, a trader opens an application on the trading station 310, which allows the trader to subscribe to one or more tradeable objects that are listed at the electronic exchange 308. Subscription information from the trading station 310 is passed to the price server 302 at the gateway 300, which then subscribes to the corresponding market data for each selected tradeable object at the electronic exchange 308. Market data may include any information associated with the tradeable object, including the best bid price, the best ask price, the last traded price, other prices outside of the best bid price and ask price, quantities at those given prices, closing price, and settlement price. The actual contents of the market data may often depend on the actual electronic exchange or the tradeable object, itself. In response to the subscription request, the electronic exchange 308 communicates the appropriate market data to the gateway 300 where the price server 302 receives and processes the information.

A trader may trade a tradeable object listed with another electronic exchange (not shown in FIG. 3) by subscribing to that exchange in a similar fashion as it did with respect to the electronic exchange 308, in the example given directly above. Then, subscription information is passed to the price server associated with the second electronic exchange, which in turn subscribes to the market data for the tradeable object(s). The preferred trading system allows the trader to access multiple exchanges through a single application on the trading station 310. Alternatively, however, a separate application may run for each electronic exchange or tradeable object.

According to an example embodiment, the market data provided by the electronic exchange 308 is given in units of a first type. As indicated earlier, a central computer at an electronic exchange may be programmed to match orders based on predefined terms and conditions. The units of the first type are associated with these predefined terms and conditions. For instance, the market data from the central computer may include price data that has units in dollars, ticks, or some other derivative of price. In another instance, the market data from the central computer may include quantity data that has units in contracts, lots, flow, or some other unit.

To illustrate a particular example, some tradeable objects have units in "flow." Examples of tradeable objects that trade in flow are energy related tradeable objects. The Intercontinental Exchange or ICE is one example of an electronic exchange that provides energy related tradeable objects. Oil, natural gas, and electric power are examples of tradeable objects currently traded at ICE and are examples of flow tradeable objects. Oil may be traded in barrels per day ("bbl/day"), gas may be traded in million British Thermal Units per day ("MMBtus/day"), and electric power may be traded in Megawatt-hours per day ("MWhrs/day").

The actual deliverable quantity of tradeable objects that specify delivery in flow can vary. For instance, a power tradeable object that specifies the delivery of a given amount of electricity per peak day for the entire delivery month will have different deliverable quantities for February (for example, "28" days) than for December (for example, "31" days). A contract represents the entire delivery amount, a lot represents the number of delivery periods in a contract, and flow represents the amount to be delivered in each delivery period. So, for instance, the ICE US PJM Power January '5 contract specifies "21" delivery periods, weekdays only, of 800 MWhrs per day. Therefore, "1" contract="21" lots×"800" MWhrs/day (flow)="16,800" MWhrs. Because the number of weekdays change in January depending on the year, the ICE US PJM Power January '6 contract would specify "22" delivery periods; so, "1" contract="22" lots×"800" MWhrs/day (flow)="17,600" MWhrs.

According to the example embodiment, attributes are used to define each tradeable object. Attributes may be utilized by the gateway 300 to determine the units in which a particular tradeable object is executed by the automated matching process. Preferably, the market data from the electronic exchange 308 conveys the attributes to the gateway 300 and/or trading station 310.

Attributes may be given as a tradeable object type, tradeable object ID, contract ID, initial margin, tick value, delivery unit, number of blocks, and multiplier. Delivery unit refers to the increment quantity of the tradeable object, also referred to as the minimum delivery (for example, "1000" barrels for oil, "2500" MMBtus for natural gas, "50" MWhrs for power, and so on, may all be minimum delivery units), number of blocks refers to the number of deliverable units in a contract (for example, there may be "31" deliverable units in a January contract, "28" deliverable units in a February contract, and so on, for power; whereas there may be "365" delivery units for a natural gas contract), and multiplier refers to the number of cycles per period, where a period is the duration of the delivery date (for example, per quarterly, per month delivery, per day delivery, and so on). The attributes may be stored at the trading station 104 and/or the gateway 106, and updated as needed.

To determine whether the market data received from the electronic exchange 308 has units of the first type, the price server 302 may determine the market data has units of flow if the following example relationship is true:

$$\frac{(MinimumQuantity \times IncrementQuantity)}{UnitQuality} > 1 \quad \text{(Equation 1)}$$

Where minimum quantity and unit quantity are values given by the exchange and relate to tick sizes, and increment quantity refers to the mimum delivery. If the relationship is not true, then the market data has units of contracts. It is understood that there are other ways to determine whether the market data is in flow, such as use of a flag bit or a series of bits in the data feed to identify the unit type. Of course, the present invention is not limited to flow/contract-type tradeable objects, so it is noted that any equation and/or mechanisms may be used here to determine the unit type, if it is necessary to do so. If the unit type of the market data is already known, and a test like this is not necessary, then this step may be skipped.

If it is determined that market data received from the electronic exchange 308 has units of a first type, then the price server 302 can convert the data into market data in units of a second type, if so programmed. Any predefined relationship may be used to perform the conversion (this relationship depends the units of the first type and what the trader prefers as his or her unit type). In other words, the price server 302 receives the market data (in a message format), detects which values require conversion by scanning the message contents, looks up the appropriate conversion relationship and attributes, and converts those values that require conversion according to the relationship. Once the conversion is complete, the price server 302 can communicate the converted market data to the trading station 310. Here are some examples for converting flow tradeable objects to contracts:

Equation 2, shown directly below, may be used to convert the portions of market data given in flow quantity into market data given in contracts. Thus, the price server 302 preferably converts the flow based quantity into contracts using the relationship:

$$\text{Contracts} = \frac{\text{Flow Quantity}}{\text{Delivery Unit}} \qquad \text{(Equation 2)}$$

In an example using Equation 2, Henry Hub Financial Gas ("Henry Hub") trades in flow per day and a delivery unit is equal to "2,500" MMBtu. Using Equation 1, the price server 300 can convert a flow quantity of "7,500" MMBtus/day to "3" contracts:

$$3 \text{ Contracts} = \frac{7,500}{2,500}$$

So, for example, let's assume that the electronic exchange 308 sends a message containing market data that indicates an offer of "7,500" MMBtus/day at a particular price to the price server 302. The price server 302 preferably recognizes that the quantity was given in flow (according to this example, it is in MMBtus/day) and performs the conversion on that piece of information to the desired units (e.g., contracts). Then, the price server 302 sends a message containing market data that indicates a bid of "3" contracts at the particular price to the trading station 310. The price server 302 could substitute the data (e.g., insert a "3" in place of "7,500") in the message, or alternatively, the price server 302 could generate a new message with the new data. This process may continuously repeat itself as the gateway receives new market data.

Figure 4:
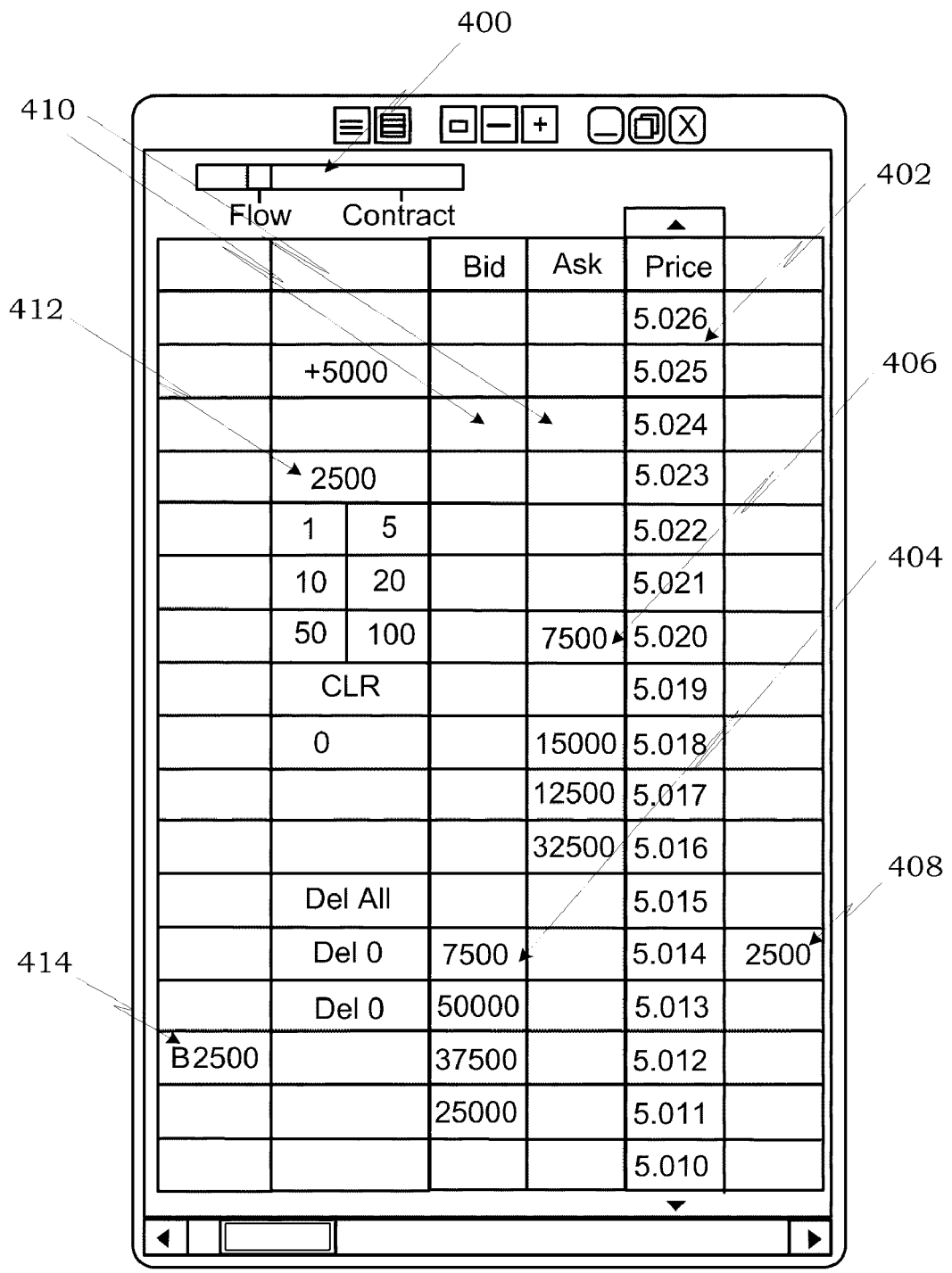
FIG. 4 illustrates a screen shot for showing an example display of market information at a trading station of either embodiment shown in FIGS. 1 and 2, the presentation of the market information is based on terms and/or conditions set forth by an electronic exchange.

It is understood that the price server may have to aggregate order quantity according to price levels. The price server may do this in those instances where the electronic exchange provides information on orders independent from one another. While displaying orders independently may have advantages in some instances, it may be desirable to view aggregated quantity. FIGS. 4 and 5, which are described later, show aggregated order quantities.

It is also understood that the process of conversion may instead occur at the trading station 310. As such, the trading station would receive the market data in units of a first type and similarly convert the market data to have units of a second type. Alternatively, the electronic exchange, itself, may perform the conversion so that those traders, who wish to view the market data in units of the second type, may receive a market data feed in units of the second type. The electronic exchange may also receive transaction messages from traders based on several types of terms and conditions and perform a conversion to standardized them for matching.

The order server 306 sets up a communication link with the electronic exchange 308 so that when a trader submits an order, the order server 306 can forward the order to the electronic exchange 308. Upon receipt of the order, the electronic exchange 308 preferably sends an order confirmation back to the order server 306. This order confirmation is forwarded on to the trading station 310 as a response.

When a trader is viewing the market data after it has been converted by the price server 302 to have units of the second type, the trader may preferably enter orders based on the units of the second type. Then, when an order is received by the order server 306, the order server 306 will preferably convert the order message having units of second type to units of the first type before forwarding the order message to the electronic exchange 308. Equation 3 is a relationship that may be used to convert contracts to flow quantity.

$$\text{Flow Quantity} = \text{Contracts} \times \text{Delivery Unit} \qquad \text{(Equation 3)}$$

For instance, let's assume that the trader is viewing Henry Hub in contract form on the trading screen. The trader decides to submit an order to buy "12" contracts at a particular price. In response to the trader's action, the trading station 310 will generate and send an order message with the order parameters to buy "12" contracts at the specified price to the order server 306. The order server 306 will preferably convert the "12" contracts to a flow quantity of "30,000" MMBtus/day ("12" contracts x "2,500" MMBtus/day/contract="30,000" MMBtus/day) and modify the order message to buy "30,000" at the specified price before sending the order message to the electronic exchange 308. If the trader is viewing Henry Hub in flow on the trading screen, then it is not necessary to perform this conversion process assuming that the order quantity is in units of flow.

The order server 306 may perform the conversion on any order message before it forwards the order message to the electronic exchange 308. In other words, the order server 306 is programmed to ensure that any transaction message is not routed to the electronic exchange in the wrong format. For instance, if the trader decides to delete part of a working order, then the order server 306 can make the proper modifications to the delete order message so that the correct quantity is deleted at the electronic exchange. If the trader decides to move the order to a different price, then the order server 306 will ensure the right order is re-priced along with the correct quantity.

The order server 306 may be programmed to accept any order type. Some examples of order types include limit orders, order-cancel-order ("OCO") orders, reserve quantity orders, and time in force restrictive orders. A limit order refers to an order message where the buy or sell quantity and price are specified, but the order can be executed at the given price or better. An OCO order is an outright limit order that is linked to another order, where a fill in one order cancels the other linked order. A reserve quantity order refers to a limit order that has a larger hidden quantity bucket as a reserve to float subsequent orders to the market in specific clip sizes; this order defines a "show quantity" and "total quantity." Once the show quantity is filled, an order equal to the show quantity will be automatically floated by the system until the total quantity has been filled. Time in force restrictive orders include good till day ("GTD"), where orders are cancelled at the end of a trading session or put on HOLD, good till time ("GTT"), where orders are put on hold after the specified time, good after logout ("GAL"), which creates a persistent order feature that keeps active orders in the market even if the trader has logged out of the system or loses connection to the electronic exchange 308.

The fill server 304 can provide historical order fills to the trading station. When the electronic exchange 308 matches an order of the user of the trading station 310, the electronic exchange 308 sends a fill order to the order server 306. The order server 306 can send a fill response to the trading station indicating the order, or part of the order, has just been filled. The fill response from the order server 306 can be used to, among other things, update the display of the graphical interface (such as shown in FIGS. 4 and 5) and initiate a log in an audit trail window. The order server 306 may also send the fill response to the fill server 304, which delivers fill data in units of the second type to the trading station 310 to be recorded and/or displayed in a fill window. The fill server 304 may also be used in failover as it maintains a historical record of the fills.

V. Example Display of Market Data

In the embodiment of FIG. 3, the trading station 310 receives the market information in converted form from the gateway 300. In other words, the price server 302 converts the market information based on units of a first type received from the electronic exchange 308 to market information based on units of a second type. The market information based on units of the second type is then broadcast over the network to the trading station 310 where it can be received and eventually displayed in the preferred units (units of the second type). According to one embodiment, the trader may choose to display the market information according to the first type, in which case, the trading station 310 will re-convert the market information back to have units based on the first type, or the trader may display the market information based on units of the second type.

In an alternative embodiment, the price server 302 at the gateway 300 does not perform the conversion. Instead, the price server 302 broadcasts the data based on units of the first type over the network to the trading station 310 where it can be received and then displayed in traditional form. In this alternative, if the trader chooses to display the market information in a different form, then the trading station 310 will preferably convert the market information into market information based on the preferred units. Otherwise, the trading station may display the market information as it comes from the exchange without going through this conversion process.

In yet another alternative embodiment, the electronic exchange may offer various data feeds that comprise data based on several different units. In this embodiment, the trader can choose which data feed (e.g., based on the trader's preferred units) to receive and process. To illustrate, an electronic exchange might provide two data feeds, one data feed contains the information based on flow and a second data feed contains the information based on contracts. From that, the trader can choose the most preferred data feed.

FIG. 4 is a screen shot illustrating a graphical interface for displaying market information associated with a flow tradeable object. For this particular example, the flow tradeable object is the Henry Hub Natural Gas contract ("Henry Hub"), although market information associated with any tradeable object, flow based or otherwise, may be presented. The standard pricing format for the Henry Hub is in dollars and cents per MMBtu to flow on a daily basis. The user interface illustrated in FIG. 4 allows a trader to view trends in the orders for the Henry Hub according to the standard format. While the particular type of graphical interface shown in FIG. 4 provides the trader with an intuitive view of the market, the present invention is not so limited. As such, any graphical interface may be utilized.

An option is provided on the graphical interface at 400 to choose between displaying the market information as flow (an example of units of a first type) or in contracts (an example of units of a second type). The option is shown as an icon that can be dragged between "flow" and "contract." When the icon is positioned over "flow," the market information is displayed according to the flow format. When the icon is positioned over the "contract," the market information is displayed according to contract format. Preferably, the option is made available to the user so that a quick selection can be made to change between the unit values, if so desired. The embodiments are not limited to the mechanism (shown at 400) utilized to switch between flow and contract, but rather one skilled in the art will recognize the many mechanisms for allowing a user to select between displaying the market information according to units of a first type or according to units of a second type. It is also noted that the words "flow" and "contract" are used in this example and are shown in FIG. 4 at 400 for illustrative purposes, however, it is understood that if the units were different than "flow" or "contract," then preferably a different representation—one that identifies those units—are displayed. Additionally, it is understood that the embodiments are not limited to flow or contracts, and that any unit of a first type or a second type may be used.

Turning to the graphical interface shown in FIG. 4, a value axis 402 is displayed and includes values representing price or some other derivative of price, like yield. While the values are displayed along a vertically oriented axis, the values may be displayed along a horizontally oriented axis or along an axis positioned at some other angle. Once the value axis 402 is generated, flow quantity and price information contained in the market data feed is received and used to populate the display against the value axis 402. As new flow quantity and price information arrives from the electronic exchange via the gateway, the trading screen is preferably updated to reflect any market changes.

Bid flow quantity indicators 404 and ask flow quantity indicators 406 are placed in the locations that correspond to their respective value or price levels along the value axis 402. Indicators that represent bid quantities are displayed at locations in the "Bid" column and indicators that represent ask quantities are displayed at locations in the "Ask" column. By looking at the trading screen in FIG. 4, the trader can quickly locate the inside market, which refers to the highest bid price and the lowest ask price, and is "5.014" and "5.016," respectively. Further, the trader can view how much flow quantity—for example, bid and ask flow quantity—is available at various price levels. Currently, there is shown a bid flow quantity of "7500 MMBtus" at a price of "5.014," and there is shown an ask flow quantity of "32500 MMBtus" at a price of "5.016." Other levels of market depth are also shown, which include a bid flow quantity of "50,000 MMBtus" at a price of "5.013" to a bid flow quantity of "25,000 MMBtus" at a price of "5.011," and an ask flow quantity of "12,500 MMBtus" at a price of "5.017" to an ask flow quantity of "7,500" at a price of "5.020." The last traded flow quantity was "2500 MMBtus" at a price of "5.014" shown at 408.

As the market conditions change, the indicators 404 and 406 can dynamically move relative to the value axis 402. Thus, the trader can quickly tell, among many other things, if the market has moved up or down in value. A trading screen similar to that shown in FIG. 4 is commercially available as MD Trader™ in the X TRADER® product offered by Trading Technologies International, Inc. of Chicago, Ill. Further, various aspects of the trading screen in FIG. 4, including the dynamic movement of the bid and offer indicators against an axis, are described in U.S. Pat. No. 6,772,132. Adjustable viewing of the axes, including the consolidation of price levels and quantities, is described in U.S. patent application Ser. No. 09/971,087, filed on Oct. 5, 2001, and entitled, "Click Based Trading with Intuitive Grid Display of Market Depth and Price Consolidation." A variety of trading tools that can be used with the trading screen to assist in visualizing the market are further described in U.S. patent application Ser. No. 10/125,894, filed on Apr. 19, 2002, and entitled, "Trading Tools for Electronic Trading". The entire content of each of the above-referenced applications is incorporated herein by reference.

The intuitiveness of the particular trading screen shown in the figure results from the dynamic display of aggregated flow quantities, collectively shown as bid flow quantity indicators 404 and ask flow quantity indicators 406, against the values along the value axis 402. Locations in alignment to the values along the value axis 402 are, in essence, fixed in relation to the value or price levels (for example, locations 410 are statically fixed to the price of "5.024"); so that as the inside market (or just "market") climbs or drops in value, the user can quickly view this change. If the market starts to go out of view, the market can be re-positioned along the value axis 402, in which, the locations will become fixed in relation to a new set of price levels. Re-positioning of the market information may occur automatically or manually. It is also noted that the columns, such as the bid, ask, or price columns may be rearranged. For instance, the value axis 402 can be moved in between the bid column and the ask column.

To enter an order using the graphical interface, a trader can preset a quantity at 412, which in this case the preset quantity is set to "2500," and with a user input device, select a cell in the "Bid" or "Ask" columns associated with the desired price of the order. For instance, if the cell associated with the price of "5.012" is selected in the "Bid" column, then an order to buy "2,500 MMBtus" at a price of "5.012" would be automatically sent to the electronic exchange. A working order icon 414 would be displayed (and an icon is displayed in the figure to represent a working order at this price) in the working order column, "Wrk Ord," indicating that a flow quantity of "2,500 MMBtus" has been sent and entered in the exchange order book. Similarly, if the cell associated with the price of "5.016" is selected in the "Ask" column, then an order to sell "7,500 MMBtus" at a price of "5.016" would be sent to the electronic exchange (an order has not been sent and therefore a working order indicator is not displayed.) Orders may be sent at other price levels too. The trading screen allows for fast order entry, but any kind of order entry system may be used to submit buy and sell orders to the electronic exchange.

According to one embodiment, a mouse input device is used to position a cursor over a cell and upon selection of the mouse button (either upon the down stroke of the mouse button or upon release of the button, however programmed), an order is sent to the electronic exchange. An order is a buy or sell order depending on whether the cursor is in the bid display region or the ask display region. In another embodiment, buttons on an input device are programmed so that when a particular button is pressed it sends a buy order to the matching engine and that when another button when pressed it sends a sell order to the matching engine.

In yet another example embodiment, a keyboard may have keys that are associated with the price levels displayed on the graphical interface. Initiating an order includes sending an order to a host exchange (for example, see the electronic exchange 104 in FIG. 1) or equivalently, leaving the "hands of the trader." For instance, the client device, a network device, or the host exchange may be programmed to verify certain parameters of the order and later reject it based on the parameters and some other criteria. Then, although the trader initiated the order, the software might still reject it and not send it to the host exchange. Software of this kind might be put into place as a risk management tool, for example.

FIG. 5 is a screen shot illustrating a graphical interface for displaying the market information first shown in FIG. 4, but now in contract form. According to this embodiment, through the option to select what units to display at 400, the user has chosen to display the market information in "contract" form. Presenting the market information in contract form has its many advantages including, among other things, that it is easier to read the smaller-in-magnitude numbers, it is generally easier to perform quick mental calculations on the information, requires less screen space because the numbers are smaller-in-magnitude. Additionally, the trader can view his or her tradeable objects in the same terms (for example, "contracts" in this example), regardless of the tradeable object or the electronic exchange.

The trader can still quickly locate the inside market, which is still at "5.014" and "5.016," respectively. Now, the trader can view how many contracts are available at various price levels. Currently, there is shown a bid quantity of "3" available at a price of "5.014," (equal to a bid flow quantity of "7500 MMBtus") and there is shown an ask quantity of "13" available at a price of "5.016," (equal to an ask flow quantity of "32500 MMBtus"). Other levels of market depth are also shown, which include a bid quantity of "20" at a price of "5.013" to a bid quantity of "10" at a price of "5.011," and an ask flow quantity of "5" at a price of "5.017" to an ask quantity of "3" at a price of "5.020." The last traded quantity is shown as "1" at a price of "5.014," which is shown at 500.

VI. Risk and P&L Calculations

Risk checking and profit and loss ("P&L") calculations for energy tradeable objects will preferably use "lots" instead of "contracts." "Lots" represent the risk exposure per contract by taking into account flow, number of blocks, and a multiplier. Lots can vary for different months with the same tradeable object. For example, a January contract for Henry Hub has "31" lots, whereas the February contract has "28" lots. As such, it is preferable to use lots rather than contracts in these calculations.

VII. Conclusion

A system, method, and program products are provided to allow a trader to trade a tradeable object according to units he or she is most comfortable, even though the electronic exchange provides the market information in units of a different type. While the example embodiments may be employed for all kinds of tradeable objects, they are particularly useful in trading certain energy tradeable objects.

Although the example programs, processes, methods and system has been described and illustrated in detail, it is clearly understood that the same is by way of illustration and example only and is not to be taken by way of limitation. Since numerous modifications and changes will readily occur to those skilled in the art, it is not desired to limit the invention to the exact construction and operation shown and described, and accordingly, all suitable modifications and equivalents may be resorted to, falling within the scope of the invention.

According to one embodiment, the example system takes the form of a computer program product that is stored on a computer readable storage medium and is executed by a suitable instruction execution system in the computer-based device. The term computer readable medium, as used herein, refers to any medium that participates in providing instructions to processor for execution. Such a medium may take many forms, including but not limited to, non-volatile media, volatile media, and transmission media. Non-volatile media includes, for example, optical or magnetic disks, such as storage device. Volatile media includes dynamic memory, such as main memory or RAM (random access memory). Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

According to an alternative embodiment, a hardware embodiment might take a variety of different forms. A hardware embodiment may be implemented as an integrated circuit with custom gate arrays or an application specific integrated circuit ("ASIC"). A hardware embodiment may also be implemented with discrete hardware components and circuitry. In particular, it is understood that the logic structures and method steps described in the flow diagrams may be implemented in dedicated hardware such as an ASIC, or as program instructions carried out by a microprocessor or other computing device.

What is claimed is:

1. A method including:
   receiving by a trading station market data associated with a tradeable object, wherein the market data includes quantity information in a flow-based unit;
   converting by the trading station the quantity information in the flow-based unit to converted quantity information in a contract-based unit;
   displaying by the trading station the converted quantity information on a trading screen;
   receiving by the trading station a first message to initiate placement of an order to buy or sell the tradeable object, the first message including an order quantity parameter in the contract-based unit;
   converting by the trading station the order quantity parameter in the contract-based unit to a converted order quantity parameter in the flow-based unit; and
   sending by the trading station a second message to buy or sell the tradeable object, wherein the second message includes the converted order quantity parameter in the flow-based unit.

2. The method of claim 1, wherein converting the quantity information in the flow-based unit to the converted quantity information in the contract-based unit is based on a predefined relationship.

3. The method of claim 1, wherein the flow-based unit is associated with a set of terms and conditions utilized by an exchange.

4. The method of claim 1, wherein the contract-based unit is associated with a set of terms and conditions preferred by a trader.

5. The method of claim 1, wherein the tradeable object includes any of the following products: oil, natural gas, or electric power.

6. The method of claim 1, wherein the flow-based unit includes any of the following units: bbl/day, MMBtus/day, MMBtus, MWhrs/day, or MWhrs.

7. The method of claim 1, wherein the second message is the first message modified to include the converted order quantity parameter in the flow-based unit instead of the order quantity parameter in the contract-based unit.

8. The method of claim 1, wherein the second message is sent to an exchange.

9. A non-transitory computer readable medium having stored therein instructions executable by a processor, wherein the instructions are executable to:
   receive market data associated with a tradeable object, wherein the market data includes quantity information in a flow-based unit;
   convert the quantity information in the flow-based unit to converted quantity information in a contract-based unit;
   display the converted quantity information on a trading screen;
   receive a first message to initiate placement of an order to buy or sell the tradeable object, the first message including an order quantity parameter in the contract-based unit;
   convert the order quantity parameter in the contract-based unit to a converted order quantity parameter in the flow-based unit; and
   send a second message to buy or sell the tradeable object, wherein the second message includes the converted order quantity parameter in the flow-based unit.

10. The computer readable medium of claim 9, wherein converting the quantity information in the flow-based unit to the converted quantity information in the contract-based unit is based on a predefined relationship.

11. The computer readable medium of claim 9, wherein the flow-based unit is associated with a set of terms and conditions utilized by an exchange.

12. The computer readable medium of claim 9, wherein the contract-based unit is associated with a set of terms and conditions preferred by a trader.

13. The computer readable medium of claim 9, wherein the tradeable object includes any of the following products: oil, natural gas, or electric power.

14. The computer readable medium of claim 9, wherein the flow-based unit includes any of the following units: bbl/day, MMBtus/day, MMBtus, MWhrs/day, or MWhrs.

15. The computer readable medium of claim 9, wherein the second message is the first message modified to include the converted order quantity parameter in the flow-based unit instead of the order quantity parameter in the contract-based unit.

16. The computer readable medium of claim 9, wherein the second message is sent to an exchange.

17. A system including:
   a trading station,
   wherein the trading station is adapted to receive market data associated with a tradeable object, wherein the market data includes quantity information in a flow-based unit;
   wherein the trading station is adapted to convert the quantity information in the flow-based unit to converted quantity information in a contract-based unit;
   wherein the trading station is adapted to display the converted quantity information on a trading screen;
   wherein the trading station is adapted to receive a first message to initiate placement of an order to buy or sell the tradeable object, the first message including an order quantity parameter in the contract-based unit;
   wherein the trading station is adapted to convert the order quantity parameter in the contract-based unit to a converted order quantity parameter in the flow-based unit; and
   wherein the trading station is adapted to send a second message to buy or sell the tradeable object, wherein the second message includes the converted order quantity parameter in the flow-based unit.

18. The system of claim 17, wherein converting the quantity information in the flow-based unit to the converted quantity information in the contract-based unit is based on a predefined relationship.

19. The system of claim 17, wherein the flow-based unit is associated with a set of terms and conditions utilized by an exchange.

20. The system of claim 17, wherein the contract-based unit is associated with a set of terms and conditions preferred by a trader.

21. The system of claim 17, wherein the tradeable object includes any of the following products: oil, natural gas, or electric power.

22. The system of claim 17, wherein the flow-based unit includes any of the following units: bbl/day, MMBtus/day, MMBtus, MWhrs/day, or MWhrs.

23. The system of claim 17, wherein the second message is the first message modified to include the converted order quantity parameter in the flow-based unit instead of the order quantity parameter in the contract-based unit.

24. The system of claim 17, wherein the second message is sent to an exchange.

* * * * *